United States Patent [19]

Shellhause

[11] Patent Number: 5,003,780
[45] Date of Patent: Apr. 2, 1991

[54] FLUIDIC VALVE MECHANISM

[76] Inventor: Ronald L. Shellhause, 519 Bennert, Vandalia, Ohio 45377

[21] Appl. No.: 458,315

[22] Filed: Dec. 28, 1989

[51] Int. Cl.$^5$ .............................. B60T 11/26; F15B 7/08
[52] U.S. Cl. ...................................... 60/585; 137/109; 137/484.2
[58] Field of Search .................. 60/533, 585; 137/109, 137/484.2, 484.4

[56] References Cited

U.S. PATENT DOCUMENTS

| | | | |
|---|---|---|---|
| 2,274,308 | 2/1942 | Tschanz | 137/109 |
| 2,315,370 | 3/1943 | Hughes | 137/484.4 |
| 2,886,052 | 5/1959 | Smith | 137/109 |
| 3,545,470 | 12/1970 | Paton | 137/484.2 |
| 3,913,327 | 10/1975 | Shellhause | 60/585 |
| 4,617,959 | 10/1986 | Yamada | 137/484.2 |

FOREIGN PATENT DOCUMENTS

| | | | |
|---|---|---|---|
| 20894 | 12/1915 | Denmark | 137/484.2 |
| 33360 | 9/1928 | France | 137/484.2 |
| 457714 | 6/1950 | Italy | 60/585 |
| 4531777 | 7/1966 | Japan | 137/109 |

Primary Examiner—John T. Kwon
Assistant Examiner—Thomas Denion
Attorney, Agent, or Firm—D. D. McGraw

[57] ABSTRACT

A fluid flow sensitive valve mechanism is positioned in a valve chamber between first and second inlet-outlet ports and controls the opening and closing of a third inlet-outlet port in response to the flow of fluid to and from the valve chamber through two or more of the ports. The valve mechanism includes a valve member and a valve positioning device. The inpingement of fluid flow acts on various surfaces of the valve mechanism so that (1) when fluid flows from the first port into the valve chamber the valve mechanism is move to close the third port and to keep the third port closed so long as there is thereafter no fluid flowing from the second or third port into the valve chambr, and (2) when fluid flows through the first port from the valve chamber, whether from the second port or the third port or both, the valve mechanism is moved to open the third port. The valve mechanism is shown as being embodied in a master cylinder, in a generic push-pull hydraulic cable arrangement, and in a vehicle parking brake system where the valve mechanism is in a hydraulic substitute for the Bowden wire type of parking brake cable.

17 Claims, 4 Drawing Sheets

FLUIDIC VALVE MECHANISM

BACKGROUND OF THE INVENTION

The valve mechanism of U.S. Pat. No. 3,913,327, entitled "Flow Sensitive Valve Mechanism" and issued October 21, 1975 in the name of the inventor of the invention herein disclosed and claimed provides the background for this invention. That disclosure provided a fluid flow sensitive valve member in a valve chamber between a pressurizing chamber and an outlet port of a master cylinder. A compensation port leading to a fluid reservoir also opened into the valve chamber.

The valve member had flow sensitive fins angularly positioned in the flow path of fluid flowing through the valve chamber. The valve member had a valve body with a guide pin extending upwardly from the body into the lower portion of the compensation port to maintain the value member in lateral position relative to the valve seat formed at the bottom of the compensation port. That seat could be engaged by the valve body to close off the compensation port when the valve was moved upwardly, and could be disengaged to open the compensation port when the valve was moved downwardly.

A first valve member flow sensitive fin, formed on the valve body, was positioned near the port to the pressurizing chamber and was angled so as to deflect the fluid downwardly when fluid pressurization in the pressurizing chamber occurred. The impact force of the fluid acting on the fin moved the valve member upwardly to close the compensation port. The fluid flowed under and around the valve member, passing into the outlet port and pressurizing the appropriate mechanism to be operated by the fluid pressure.

A second valve member flow sensitive fin, also formed on the valve body and parallel to the first fin, was positioned near the outlet port so that when the pressure was released, the fluid flowing back into the valve chamber from the outlet port impinged on the second fin, forcing the valve member downwardly and opening the compensation port. The returning fluid coming back through the outlet port flowed through the compensation port into the fluid reservoir and also past the valve member back into the pressurizing chamber. The valve member was made of a material having a specific gravity slightly greater than the specific gravity of the fluid used so that the assembly would be self-bleeding.

FIELD OF THE INVENTION

The invention relates to flow sensitive valves of the general type shown in the above-noted U.S. Patent, and more particularly to compensation port-controlling valve mechanism adapted for use in or with master cylinder assemblies, hydraulic control systems and remote or integral fluid reservoirs. The valve mechanism is sensitive to the flow of fluid from pressurizing chambers to brakes, clutches and other hydraulic pressure actuated devices. It is also sensitive to return flow in such device systems.

SUMMARY OF THE INVENTION

The valve mechanism has features that provide positive functional actions that cannot be deviated and are necessary because of the extremely sensitive flow conditions in the mechanism. The invention has structure which controls the valve member during all fluid flow conditions, and particularly during post-release fluid flow situations, to force the valve member to the proper position for each function.

These functions include (1) sealing the reservoir port at the minimum flow conditions occurring with very slow apply rates; (2) causing all return flow coming back toward the reservoir and the master cylinder upon release of the master cylinder to enter either the master cylinder bore or the reservoir; and (3) causing all post-release return flow to enter the reservoir. Furthermore, during certain of the final release instantaneous positions, or during post-release flow conditions, to allow reapply demand imposed on the system to take control of the valve so that a safe, substantially instantaneous reapply is obtained.

The structure which accomplishes this includes a valve member providing an arrangement for sealing and opening the reservoir port, either as a subassembly of a valve mechanism or as a single component mechanism. It has been found convenient to refer to the valve member, or the entire valve mechanism, as a fluidic valve, indicating that it is operated by and controls fluid flows and pressures by flow of the fluid itself. When the valve mechanism is a multi-part assembly, it includes the valve member and a positive valve member positioning device. Some type of such positive positioning arrangement has been recognized as being very desirable to assure that the valve is always properly positioned for the function needed to be accomplished. There are conditions where the valve, when in one basic mode, can be adversely affected by other transient fluid flow situations which can occur unless a positive interface exists.

One such positive positioning device or interface structure is preferably a strut-like pivotable lever formed from sheet material, preferably a metal such as stainless steel, and having flow impingement areas which are acted upon by various fluid flows to move the lever so that it either prevents or permits the valve member to close the reservoir port. Another device is formed as an integral part of the valve member which cooperates with a receiving chamber and is acted upon by various fluid flows to obtain similar results.

Advantages obtainable by employment of the fluidic valve embodying the invention are numerous. They include:

(1) Reduction in length of a master cylinder. The secondary seal can be eliminated, giving as much as a forty percent reduction in master cylinder length. Further length reduction is attainable by substantially reducing the return spring loads because high return spring loads are not necessary.

(2) With shortened master cylinders, the technique of recessing the master cylinder axially within a typical vacuum power brake booster will result in having very little of the master cylinder protruding axially beyond the booster, taking up much less space in an automotive engine compartment than a booster-master cylinder combination in which most if not all of the master cylinder protrudes axially beyond the booster.

(3) Remote reservoirs can be used in various hydraulic actuating and release systems. For example, they may be used in a hydraulic brake system without the added cost penalty of additional fluid lines and fittings to connect the remote reservoir to the master cylinder. The fluidic valves can be used to feed brake fluid at any high point in the line in the pressure system between the master cylinder and the vehicle brake assemblies. This, in combination with the very short booster-master cylinder assembly, provides much more latitude in brake system routing and design without added complexity or cost penalty. The same advantages apply in a hydraulic push-pull cable system used for two-position or other multiple position control of a mechanism. Such mechanisms include air flow doors in heating and air conditioning systems for vehicles as well as buildings or sensitive equipment, and vehicle parking brake cable connections between a parking brake pedal and the parking brake itself.

(4) Silicone brake fluid can be more readily used with the fluidic valves because very little negative pressure is created on any release stroke, and makeup or compensation fluid to the system takes place with very little fluid aeration.

(5) Air removal is a natural with the fluidic valve. Any air bubbles in the hydraulic fluid system, commonly caused by fluid aeration, are quickly cleared into the reservoir, eliminating that undesirable cause of fluid compression which when the brake system is actuated contributes to brake loss.

(6) Master cylinder seal life is improved since the seals do not have to run over bypass holes in the master cylinder bore. This totally eliminates the cutting of the seal or cup lips by the bypass holes. Since cup lip seals are not needed, intermittent failure of the cup seals through hydroplaning is also eliminated. In prior master cylinder designs using lipped cup seals, the lips had to collapse to allow makeup fluid to pass into the system. On rare occasions, this feature allowed hydrostatic shock to support the cup lips away from the master cylinder bore. This resulted in what is known in the brake industry as a phantom failure. The problem would be evident when both pressure chambers were affected in this manner at the same time, giving a complete loss of braking action on a master cylinder actuating stroke, yet would appear to fully recover on the next actuating stroke with no structurally apparent reason for the intermittent failure when the master cylinder was examined.

Eliminating the bypass holes also eliminates the need for critical location of the bypass holes. This simplifies manufacture, since only bore surface finish and stroke length remain to be controlled. The outlet holes are considerably larger in diameter than bypass holes, and position tolerances for these holes are relatively liberal. With master cylinder bores 40% to 50% shorter because of elimination of the secondary seals and the bypass holes, only one seal being necessary per pressure chamber, machining is reduced. Shorter bore depths are more easily machined.

(7) A serious concern in failure mode studies of master cylinders is the presence of particles of foreign material in the brake fluid circuits. Such materials can cause seal and bypass orifice failures once it is in the pressure side of the brake system. Materials commonly found are small plastic flashing segments, small metallic particles, and small seal material which originated as flashing or because of the nipping of the seal cup lips.

To provide an absolute worst case test, particles of materials having about the same density as brake fluids, lighter than brake fluids, and also heavier than brake fluids, were packed into fluidic valves embodying the invention herein disclosed and claimed. Consistently after several apply cycles all of the foreign material would be blown from the valve chambers into the reservoirs, leaving the valves purged for the next apply. While purging the valves of the foreign materials, only a slight pedal travel loss occurred, with two to five pedal strokes purging even the packed valve chamber. Obviously, such a packed valve chamber is an artificial contrivance, and is a much worse condition than that found at any time in actual practice.

With the fluidic valve made of polyamide, a material only slightly more dense than brake fluid, polyamide flash debris is a possibility. Such debris will float and move around in the brake fluid with very little fluid flow. Tests showed that even if a large piece of polyamide flash with small entry dimensions should occlude the valve seat area, the valve sealing performance is diminished in that one valve chamber because the compensation port acts as a restrictive orifice for only one apply, only for that valve chamber, and not both chambers. The next apply was consistently found to purge the valve as the debris entered the reservoir.

The flow energy in the fluidic valve is immense, even on the slowest of master cylinder apply operations. It is this intense flow energy that keeps the entire valve area clean and clear of debris. Tests with extremely slow pedal applications by a machine in a very uniform manner, on the order of as much as thirty seconds to one minute, which are well beyond the slowest of pedal applications by a human brake operator in a vehicle, still closed each fluidic valve in less that 0.010 inch pedal travel loss for a dual chamber master cylinder. When applied in a typical manner by typical drivers, less that 0.002 inch pedal travel loss is common with a dual chamber master cylinder using fluidic valves. Considering that this is travel loss at the pedal itself, and that there is commonly about a 4:1 to 7:1 pedal ratio in vehicle service brake pedal arrangements, the fluidic valve for the primary pressurizing chamber is closed with a miniscule amount of master cylinder primary pressurizing piston movement. Assuming a 5:1 pedal ratio, the typical 0.002 inch pedal travel required to close the valve translates into 0.0004 inch movement of the primary pressurizing piston in the pressurizing direction to close the valve. With typical bypass holes and lipped cup seals, the primary piston movement required to move the primary cup seal lip to cover the primary bypass hole is on the order of 0.05 inch to 0.10 inch. With the same 5:1 pedal travel ratio this translates to pedal travel loss of about 0.25 inch to 0.5 inch. It is apparent that the use of the fluidic valve reduces the pedal travel loss by 0.248 inch to 0.498 inch. This is a 125:1 to 250:1 improvement. When expressed in percentage improvement, this is an astounding 12,500% to 25,000% improvement. A typical dual master cylinder with fluidic valves instead of cup seal lips, bypass ports and compensation ports has been found to provide as much savings in pedal travel loss as a quick take-up master cylinder, but without the complexity and losses of the old stepped bore quick take-up design.

DESCRIPTION OF THE PREFERRED EMBODIMENTS

Figure 1:
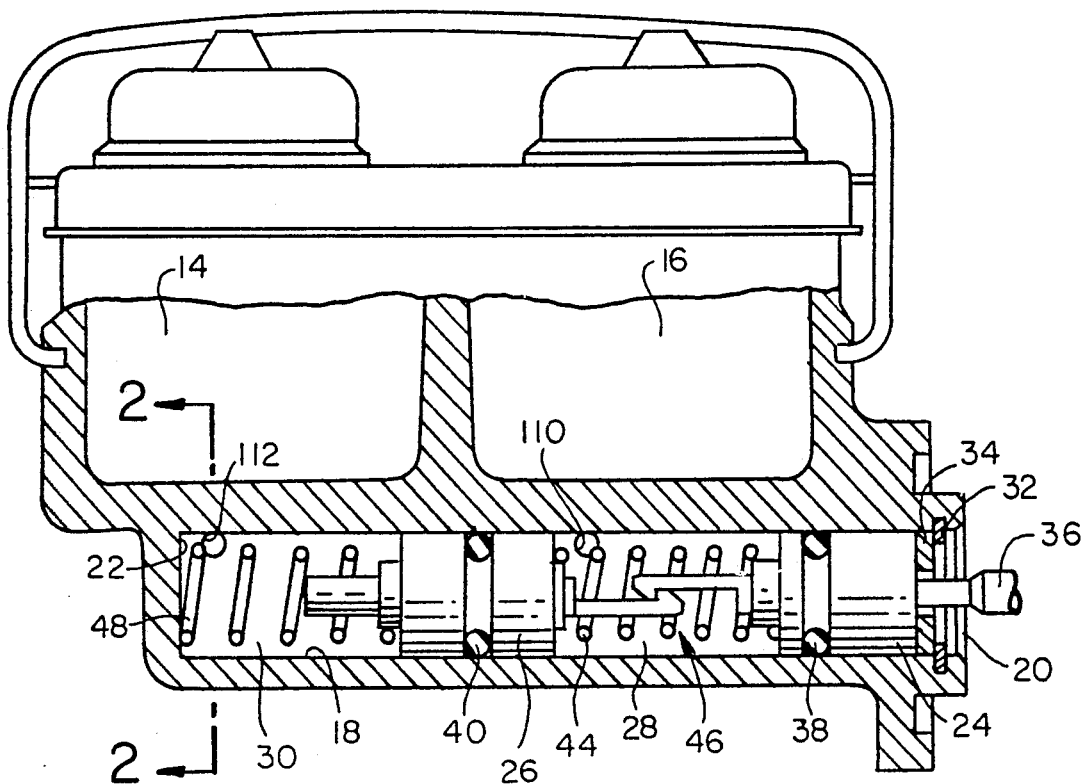
FIG. 1 is a side elevation view, with parts broken away and shown in cross-section, showing a master cylinder assembly containing the invention, the inventive structure being located out of the plane of the cross-section view.

The master cylinder assembly 10 of FIGS. 1, 2, 4 and 5 has a housing 12 formed to provide reservoir chambers 14 and 16 and a bore 18. The bore has an open end 20 and a closed end 22. Primary pressurizing piston 24 and secondary pressurizing piston 26 are reciprocally received in bore 18. A primary pressurizing chamber 28 is defined by the bore 18 and the pistons 24 and 26. A secondary pressurizing chamber 30 is defined by the secondary piston 26 and the portion of bore 18 adjacent the bore end 22. A piston stop 32 in the open end 20 of the bore 18 cooperates with a washer 34 against which the rear end of the primary piston 24 may rest to provide a piston stop arrangement which positions the pistons when the brakes are released. Push rod 36 extends through stop 32 and washer 34 and is connected with piston 24 so that movement of the push rod in one direction (leftwardly as shown in FIG. 1) will actuate the master cylinder to pressurize fluid in the pressurizing chambers 28 and 30. Primary seal 38 is positioned in a seal groove of piston 24, and secondary seal 40 is positioned in a seal groove of piston 26. A primary piston return spring 44 is positioned in the primary pressurizing chamber 28 and operatively acts on pistons 24 and 26 through a spring caging mechanism 46. A secondary piston return spring 48 is located in secondary pressurizing chamber 30 and operatively engages the bore end 22 and the secondary piston 26. Both piston return springs are preferably preloaded in compression when the pistons are in the brake release position shown in FIG. 1, with the primary piston return spring 44 having the greater preload. Thus when the master cylinder is in the brake release position the caging mechanism 46 establishes the precise distance that the pistons 24 and 26 are spaced apart by the spring 44, with spring 48 urging the secondary piston 26 to its released position and acting through spring 44 to urge primary piston 24 to its released position.

The caging mechanism 46 is more fully described in U.S. Pat. No. 3,913,327 noted above, and is not relevant to the claimed invention other than providing a functional dual master cylinder in the system disclosed. It is therefore sufficient to note that the primary piston 24 can move relative to the secondary piston 26 so as to pressurize fluid in primary chamber 28 when the master cylinder is actuated. When the master cylinder is released, pressure-generated forces in chambers 28 and 30 and the forces of piston return springs 44 and 48 move pistons 24 and 26 toward stop 32. The greater spring force of primary piston return spring 44 assures that pistons 24 and 26 will be spaced axially apart, this space being determined by the caging mechanism which defines and limits the maximum axial space between these pistons. When the primary piston 24 is operatively seated on stop 32 and the caging mechanism is at its maximum axially extended limit as illustrated in FIG. 1, pistons 24 and 26 are properly located in the bore 18 in preparation for the next master cylinder actuation from the full release position.

Primary and secondary pressurizing chambers 28 and 30 are respectively provided with ports 110 and 112 formed in the master cylinder body and located in the forward ends of their respective pressurizing chambers. Ports 110 and 112 are operatively connected to separate brake circuits, not illustrated but well known in the brake art, which contain brakes to be actuated by hydraulic pressures generated in pressurizing chambers 28 and 30 and operatively delivered to those circuits through those ports. Brake fluid is returned from each of the brake circuits to the pressurizing chambers through ports 110 and 112 when the brakes are released by releasing the master cylinder. The release of the master cylinder permits the pressurizing chambers 28 and 30 to expand as the pistons 24 and 26 are moved to their released positions. Brake fluid from the brake circuits is also returned to the master cylinder reservoir chambers 14 and 16 through compensation ports. One of the fluidic valve mechanisms to which the invention is directed controls the opening and closing of each of the compensations ports.

Valve mechanism 114, variously illustrated in FIGS. 2-7, controls the compensation port 116 operatively connecting pressurizing chamber 30 with reservoir chamber 14. A similar valve mechanism controls the compensation port operatively connecting pressurizing chamber 28 with reservoir chamber 16. However, since the construction of that mechanism and its environment is the same as that of valve mechanism 114, only one valve mechanism and its environment are illustrated and further described.

Port 112 extends laterally from chamber 30 and opens into valve chamber 118, which is formed in housing 12. Another port 120 communicates chamber 118 with the outlet 122 which is suitably connected to a brake conduit forming a part of one of the brake circuits and the brakes in that one circuit. Ports 112 and 120 are in fluid flow alignment and may be considered to be an inlet-outlet passage in which chamber 118 is formed. Compensation port 116 extends from reservoir 14 to chamber 118 through a valve seat 124 formed at the point where port 116 opens into chamber 118. Valve seat 124 is formed by a beveled area. This area may be a conical or a spherical annular surface segment.

The valve mechanism 114 includes a valve member 126 which is arranged to cooperate with the valve seat 124 to open or close the valve seat, depending upon the position of the valve member in valve chamber 118. The valve member has a valve body section 128 provided with a guide pin 130. The valve body section 128 has a spherically formed end segment 132 from which guide pin 130 axially extends. The guide pin extends into the lower portion of compensation port 116 so as to maintain the valve member 126 in lateral position relative to valve seat 124. To this descriptive extent, the valve mechanism is similar to the valve member of the above noted patent. However, its flow sensitive areas are differently constructed and the preferred valve mechanism illustrated includes a separate valve member positioning device to be described.

The valve body section 128 is either cylindrical or slightly conical in general conformation, with its base integrally formed with and extending from a planar section 134 at an angle someWhat less than 90°. A generally rectangular opening 136 is formed through the planar section 134 so that the planar section has an end surface 138 at the opposite end 140 of the opening 136 from the valve body section 128. The other opening end 142 extends upwardly through a part of the base of valve body section 128, with a wall portion 144 of the valve body section defining the upward extending portion of opening end 142. Wall portion 144 is at an acute angle to the planar section 134, that angle being a smaller angle than the angle of the valve body section 128 to the planar section 134, as shown by a dashed line in FIGS. 2, 4 and 5. Wall portion 144 provides a reaction area for a portion of the positive valve member positioning device 146. That device is shown in its installed cooperative position with the valve member 126 in FIGS. 2, 3, 4 and 5, and is shown separately in FIG. 7. The valve member 126 has a slot-like opening 148 in the end surface 150 of planar section 134. Opening 148 is located in the end of planar section 134 which is opposite its end surface 138, and is near the valve body section 128. It extends laterally across the planar section 134. The valve member 126 is also provided with legs 152 and 154 which are formed integrally with the sides 156 and 158 of planar section 134, the legs extending in parallel planes slightly outward from the planar section 134 on either side of opening 136 on the same side of the planar section as valve body section 128. The legs also continue to extend in the parallel planes from the other side of the planar section 134, as shown by leg sections 160 and 162, terminating in laterally spaced and preferably rounded ends 164 and 166. Legs 152 and 154 are of equal length and preferably lie in parallel planes which are perpendicular to planar section 134. The space between the legs is effectively a continuation of the opening 136.

The valve member positioning device 146 is preferably made of a thin sheet of metal such as stainless steel. From its center portion 170 it has a bent section composed of two bends made at opposite angles, with the corner 172 of one bend defining a stop surface or line which is engagable with the valve body section wall portion 144. The positioning device has a first fluid flow impingement section 174 extending from bend corner 172 to the outer end 176 of the device. It has a second fluid flow impingement section 178 extending from the second bend 180 of another pair of opposite angle bends formed at the other side of its center portion 170 from bend corner 172. Bend 180 defines a pivot line for the device. The portion 182 of the device connecting the two bends near bend corner 172 and the portion 184 of the device connecting the two bends near bend 180 extend from the same side of the plane containing the device center portion 170. The device portion 184, the center portion 170, the device portion 182 and the first fluid flow impingement section 174 are slightly narrower in width than the widths of openings 136 and 148 so that they can be inserted therethrough.

The second fluid flow impingement section 178 of device 146 extends laterally outward at bend 180 so as to define shoulders 186 and 188. Second impingement section 178 is curvilinear in edge view, as shown in the drawings, being concave on the side facing the first impingement section 174, and is generally oval in its plan shape. Its terminates at end 190 of device 146.

Figure 2:
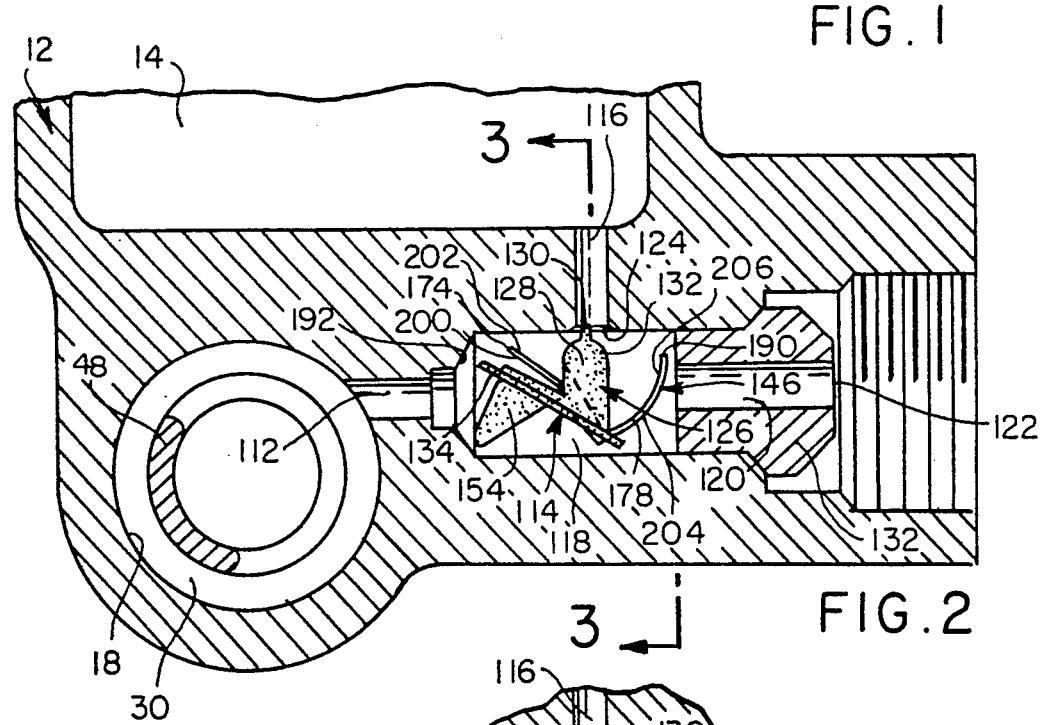
FIG. 2 is a cross-section view taken in the direction of arrows 2—2 of FIG. 1 and showing the valve mechanism embodying the invention in one position and condition of operation.
Figure 3:
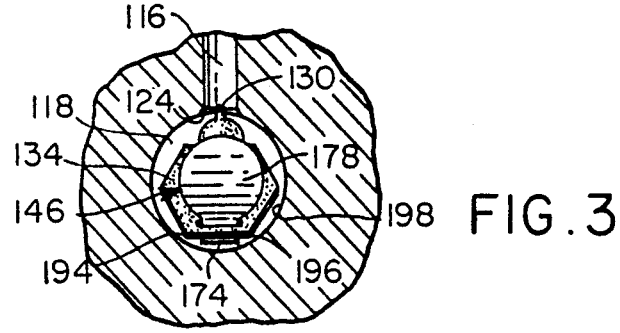
FIG. 3 is a fragmentary cross-section view taken in the direction of arrows 3—3 of FIG. 2 and illustrating the valve mechanism from an axial viewpoint.

The device 146 is assembled into the valve member 126 by inserting the first impingement section 174 through opening 148 from the side of the planar section 134 on which the valve body section 128 is located, until shoulders 182 and 184 engage the surface of planar section 134 on either side of opening 148, at the same time pivoting the device so that the second impingement section 178 clears the valve body section 128. This pivoting movement is continued until the first impingement section 178 extends into the opening 136 and bend corner 172 engages wall portion 144 as shown in FIG. 2. This assembly forms the valve mechanism 114.

The valve mechanism is inserted in valve chamber 118 before the port plug 132 through which port 120 is formed is pressed into position, legs 152 and 154 being inserted first. When plug 132 is pressed into position after the valve mechanism is installed, its inner end defines one end wall of the valve chamber 118. The guide pin 130 is pointing upward so that it fits within the compensation port 116 when the valve mechanism is in proper functioning position. The end 190 of the positive positioning device 146 is also pointing upward during insertion. When the valve mechanism reaches its functional position shown in FIGS. 2 and 3, the rounded leg ends 164 and 166 are touching the beveled end portion 192 of valve chamber 118 through which port 112 opens into the valve chamber. This touching relationship provides an axial position limit for movement of the valve mechanism toward port 112 when the valve mechanism is entrained in fluid flow back into the pressurizing chamber 30 occurring upon release of the master cylinder. When the valve mechanism 114 is in the position shown in FIG. 2, the corners 194 and 196 of the valve member planar section 134 also touch the cylindrical wall surface 198 defining the right cylindrical portion of valve chamber 118. The positive positioning device 146 is in the position illustrated in FIG. 2. This presents the underside 200 of the first fluid flow impingement section 174 to any fluid flow from port 112 into the valve chamber 118, and the upper side 202 of impingement section 174 to any fluid flow from either port 116 or port 120 to port 112. It also presents the convex side 204 of the second fluid flow impingement section 178 to fluid flow from port 120 into valve chamber 118, and the concave side 206 of impingement section 178 to fluid flow from ports 112 and 116 through valve chamber 118 toward port 120.

Figure 4:
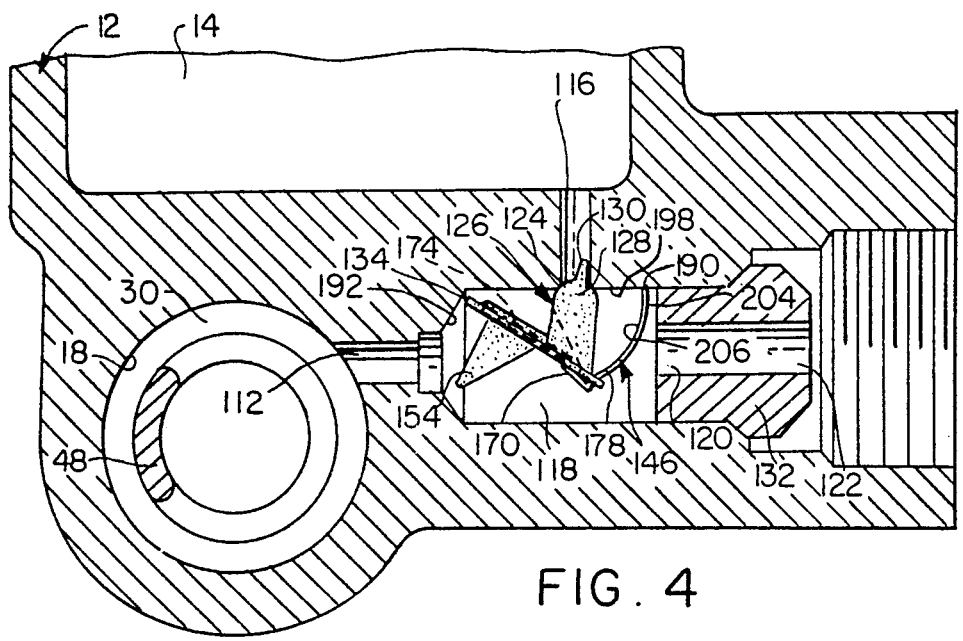
FIGS. 4 and 5 are cross-section views similar to FIG. 2, showing the valve mechanism in other positions and conditions of operation.
Figure 5:
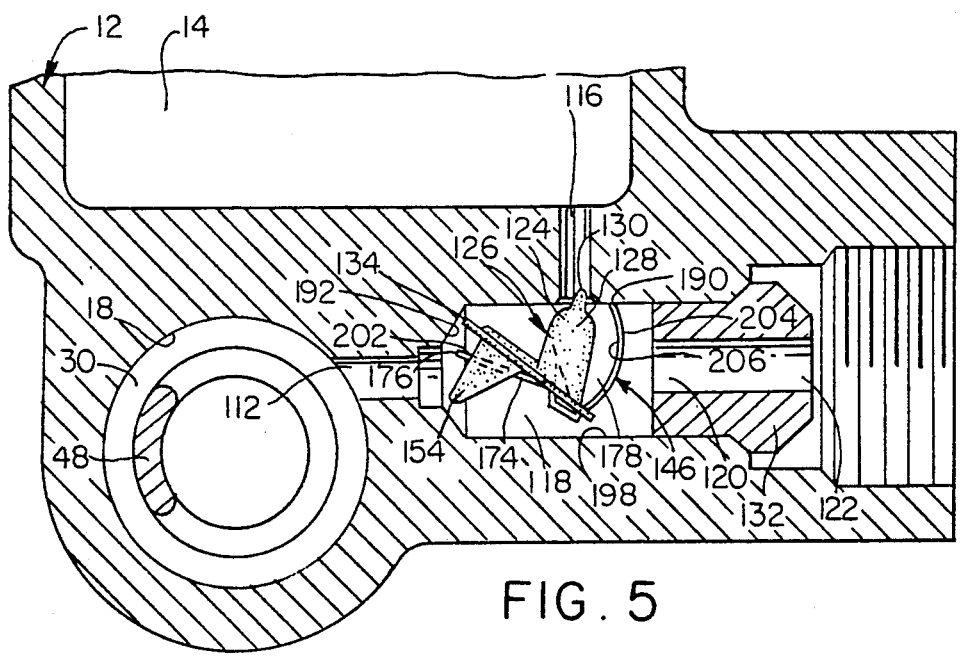
Figures 6, 7:
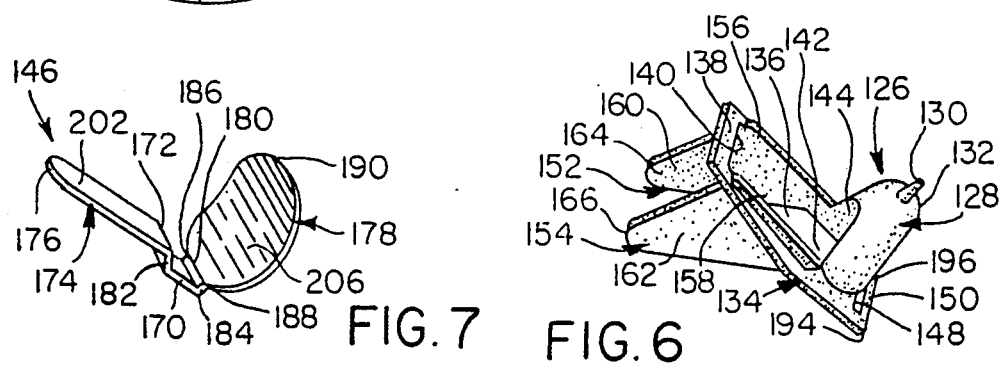
FIG. 6 is an isometric view of the valve member of the valve mechanism embodying the invention.
FIG. 7 is an isometric view of the positive positioning device which cooperates with the valve member of FIG. 6 to form the valve mechanism embodying the invention.

When the master cylinder 10 is actuated, the valve mechanism 126 is moved from the position shown in FIG. 2 to its position shown in FIG. 4. Compensation port 116 is closed by the valve member body section 128 and actuating fluid under pressure flows through valve chamber 118 from port 112 to port 120 and then through outlet 122 into the circuit connected to that outlet. Flow direction arrows indicate this flow. So long as there is no flow back into the valve chamber 118 through port 120, the valve mechanism 126 will stay in the valve closed position.

The valve member positioning device 146 functions as a valve lockout strut upon the beginning of return flow as the master cylinder is being released. It moves on the least occurrence of return flow from the port 120 into the valve chamber to open the valve and then prevent the valve from sealing. This is the valve mechanism position shown in FIG. 5. Flow direction arrows indicate this return flow as well as compensating flows into and out of the reservoir chamber as they occur.

After the release of all of the fluid pressure in the brake circuit, so that no more fluid flow is taking place in the valve chamber, the valve mechanism returns to the position shown in FIG. 2. However, before such stasis occurs, there is a slow return flow from the brakes and the brake lines caused by seal and brake line recovery. This return flow, even though very slow, is sufficient to keep the device 146 so positioned as shown in FIG. 4 that the valve will not reseat. At the same time, any apply operation of the master cylinder again causing fluid flow from port 112 into the valve chamber 118 acts on the device 146, and particularly on its under surface 200, pivoting it clockwise as seen in FIG. 4, about pivot line 180 and moving its end 172 downwardly and away from contact with the valve chamber wall surface 198, immediately deactivating the lockout function of the device. This pivoting movement of device 146 about pivot line 180 results in the stop line or surface 172 engaging the valve body wall 144, preventing further pivoting movement of device 146 relative to the valve member 126 and the fluid flow impingement forces acting on the valve mechanism move it back to the position shown in FIG. 4. The brake apply fluid flow from port 112 impinging on the under side 200 of the first fluid flow impingement section 174 achieves this. The area of under side 200 is in the nozzle effect flow area created by port 112.

While the surfaces 200, 202, 204 and 206 of device 146 are the primary fluid flow impingement areas, the upper and lower sides of valve member planar section 134 may also be subjected to some fluid flow impingement which generates forces contributing to desired valve mechanism movements.

If a remote reservoir with fluidic valves is used, no valves are necessary in the master cylinder. It becomes simply a tube with outlets, further simplifying its manufacture. A hydraulic brake system with such an arrangement can be used in tractor-trailer combinations with quick disconnect brake line fittings. It is particularly conducive to the use of silicone brake fluids, because there are at most only a few drops of fluid lost when disconnecting and reconnecting the quick disconnect fittings, and this occurs at a point intermediate the tractor and trailer so that the silicone fluid does not touch any paint which might otherwise be damaged by brake fluid. Any air included with the quick disconnect operation is quickly dispersed into the remote reservoir by the fluidic valves as above described. This in turn leads to the practicality of use of incompressible hydraulics in tractor-trailer combinations instead of compressible air with its accompanying delayed response problems. Therefore a much better anti-skid brake system response is attainable. By placing a fluidic valve-controlled remote hydraulic brake fluid reservoir at a high point in the brake line, these obstacles are overcome.

Figure 8:
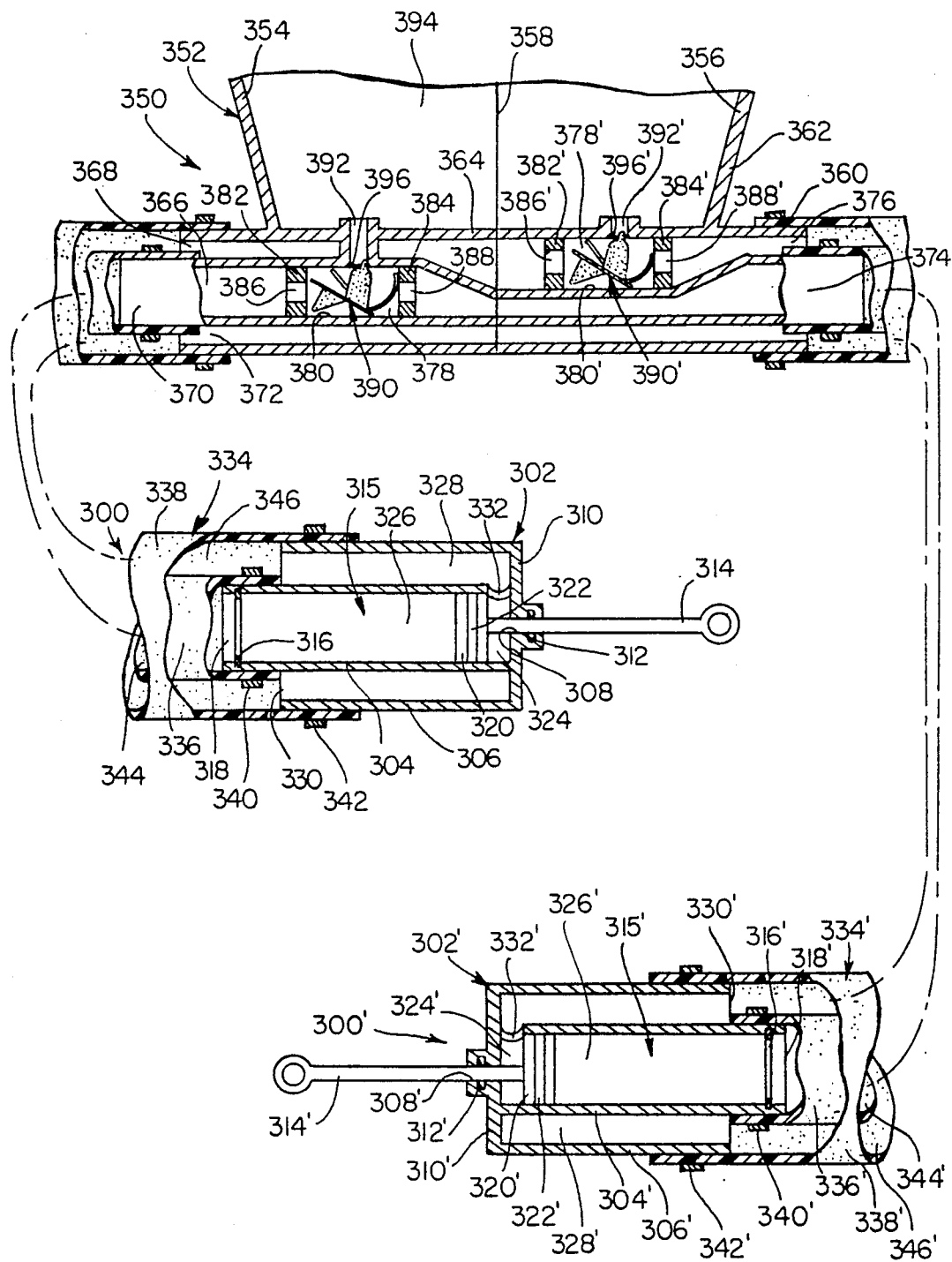
FIG. 8 is a schematic illustration of a hydraulic push-pull cable assembly using fluidic valve mechanisms as a part of a remote reservoir.
Figure 9:
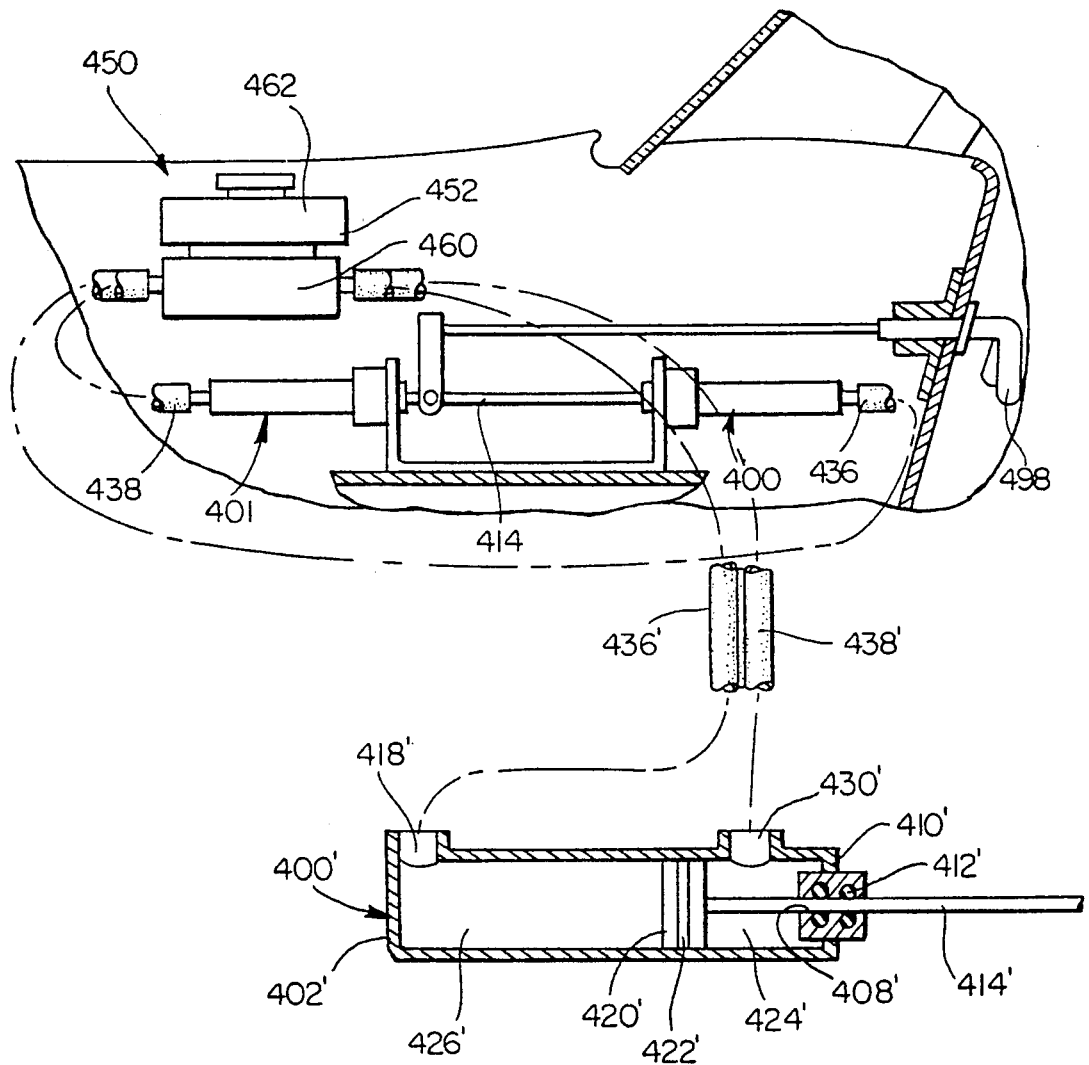
FIG. 9 is a schematic illustration of the cable assembly of FIG. 8 installed in a vehicle as a parking brake cable assembly.

The schematically illustrated hydraulic push-pull cable assembly of FIGS. 8 and 9 incorporates the use of a remote reservoir and fluidic valves controlling the fluid communication between the reservoir and the hydraulic circuits of the assembly. In this assembly, there is an actuator/servomotor 300 shown schematically as having a housing 302 constructed to provide an inner housing section 304 and an outer housing section 306 positioned concentrically about the inner housing section 304. An opening 308 in the closed end wall 310 of housing 302 is provided with a seal 312. A push rod 314 extends through opening 308 in reciprocal sealing relation with seal 312. Housing inner section 304 has a chamber 315 therein. A piston stop 316 is provided in the chamber outlet/inlet end 318, and a piston 320 with a peripheral seal 322 is sealingly and reciprocally received in chamber 315, dividing that chamber into a rear chamber section 324, located axially between end wall 310 and the rear face of the piston 320, and a front chamber section 326, located axially between the front face of the piston 320 and the outlet/inlet 318. An annular chamber 328 is located radially between the inner housing section 304 and the outer housing section 306. Chamber 328 has an annular inlet/outlet 330 located generally outward of the outlet/inlet 318 of chamber 315. An aperture 332 in the inner housing section 304 is located adjacent end wall 310 and provides a fluid connection between chamber section 324 and annular chamber 328. A concentric two-conduit hose 334 has an inner conduit 336 and an outer conduit 338 respectively secured about outlet/inlet 318 and inlet/outlet 330 by securing means 340 and 342 so as to separately conduct hydraulic fluid to and from them without leakage either to atmosphere or between the front inner chamber section 326 and annular chamber 328. Conduits 336 and 338 cooperate to define the inner hose passage 344 and the annular outer hose passage 346. These passages separately conduct fluid to and from the respective chambers 326 and 328 to which they are openly connected.

For simplicity of illustration in the drawing, an identical actuator/servomotor 300' is also provided, and the same parts are identified with the same reference characters, but with a prime mark. Actuator/servomotor 300 may be considered to be the master unit and actuator/servomotor 300' to be the slave unit. Of course, these units need be only functionally comparable rather than physically identical.

A reservoir assembly 350 includes a reservoir housing 352 schematically illustrated as being made in two sections 354 and 356 for assembly purposes, the two sections being sealingly joined at split line 358. Considering housing 352 as a unitary housing for descriptive purposes, it has a main body portion 360 and a reservoir chamber portion 362, portion 362 being located on the upper side of portion 360. They have a common wall 364. Housing main body portion 360 has two passages formed axially therethrough, passage 366 being the inner passage and passage 368 being the annular outer passage surrounding the inner passage. Passages 366 and 368 respectively have inlets/outlets 370 and 372 at one end of housing main body section 360 and outlets/inlets 374 and 376 at the other end of housing main body section 360. Inner passage 366 has a valve chamber 378 formed therein, that chamber being defined by the portion of the inner wall 380 between valve chamber ends 382 and 384. The valve chamber ends are schematically illustrated as being annular plugs press fitted in inner passage 336 in axially spaced relation. They respectively have ports 386 and 388 formed axially therethrough. Valve mechanism 390 is contained in valve chamber 378. A compensation port 392 extends from valve chamber 378 into the reservoir chamber 394, and its end opening into valve chamber 378 is provided with a valve seat 396. While reservoir chamber 394 is a single chamber, it may be divided into two reservoir chambers when appropriate, as in a remote reservoir dual circuit service brake system. In the push-pull hydraulic cable arrangement of FIGS. 8 and 9, however, it is preferable that it be a single reservoir.

Another identical valve chamber 378', valve mechanism 390', compensation port 392' and related structure are provided in and for outer passage 368. Therefore the same reference numbers, with prime marks, are used to identify the same or comparable structure.

Much of the reservoir and valve assemblies structure is comparable to the structure of FIGS. 2 through 7. Valve chambers 378 and 378' are comparable to valve chamber 118. Valve mechanisms 390 and 390' are comparable to valve mechanism 114. Ports 386 and 388 and ports 386' and 388' are respectively comparable to ports 112 and 120. Ports 392 and 392' are comparable to port 116. Valve chamber ends 382 and 382' are comparable to valve chamber end 192, and although not so shown schematically, may be beveled in the same manner.

At times it will be preferable to omit the use of concentric hoses, passages, conduits, chambers, outlets/inlets and inlets/outlets. It is within the scope of the invention to provide parallel hoses, passages, etc. if desired. If more than two fluid circuits are being used, then there may be a fluidic valve and related structure for each of such fluid circuits.

As schematically shown in FIG. 8, hose 334 is connected to housing main body portion 360 so that inner chamber front section 326 and hose inner passage 344 are connected to inner passage 366 at inlet/outlet 370, and outer chamber 328 and outer hose passage 346 are connected to outer passage 368 at inlet/outlet 372. Similarly, hose 334' is connected to housing main body portion 360 so that inner chamber front section 326' and hose inner passage 344' are connected to inner passage 366 at outlet/inlet 374, and outer chamber 328' and outer hose passage 346' are connected to outer passage 368 at outlet/inlet 376.

When the system is ready for operation, it is filled with hydraulic fluid so that all chambers, passages and conduits are full, with the reservoir chamber 394 having sufficient hydraulic fluid in it for makeup, use and compensation. When push rod 314 is moved leftwardly as seen in FIG. 8, piston 320 pressurizes fluid in chamber section 326, causing fluid flow in hose inner passage 344 to be transmitted to inner passage 366 of housing main body portion 360. The fluid flow through port 386 acts on valve mechanism 390 to close port 392, and the fluid flows under pressure through port 388 and outlet/inlet 374 into the inner passage 344' of hose assembly 334'. It enters chamber section 326' and acts on the front face of piston 320', causing that piston and push rod 314' to move leftwardly as seen in FIG. 8. This movement is identical to the movement of push rod 314, but in the opposite direction relative to chamber 315. Piston 320' displaces hydraulic fluid from chamber section 324', causing it to flow through outer chamber 328' into hose outer passage 346', which conducts it to outlet/inlet 376. It then flows through port 388', acting on valve mechanism 390' to assure that port 392' is open. The hydraulic fluid so returned to valve chamber 378' may continue through outer passage 368 and be conducted to chamber 328 through hose outer passage 346 so that it can enter chamber section 324 through aperture 332 to compensate as that chamber section increases in volume. Because that chamber section tends to be at a negative pressure as piston 320 is moved in the actuating direction, hydralic fluid may also enter valve chamber 378' from reservoir chamber 394, assuring that there is no shortage of hydraulic fluid for chamber section 324.

When push rod 314 is moved rightwardly as seen in FIG. 8, if forces fluid flow from chamber section 324 through chamber 328 and hose outer passage 346 to outer passage 368 of housing main body portion 360. This fluid flows through port 386' into valve chamber 378', acting on valve mechanism 390' to close port 392'. The fluid then continues its flow under pressure through outlet/inlet 376 and hose outer passage 346' into chamber section 324' via chamber 328' and aperture 332'. The pressure moves piston 320' rightwardly, moving push rod 314' with it. Piston 320' forces fluid from chamber section 326' through oulet/inlet 318' and hose inner passage 314' into outlet/inlet 374 and inner passage 366 of housing main body portion 360. When the fluid flows through port 388, it acts on valve mechanism 390 to open port 392. The fluid flows through port 386 and inlet/outlet 370 into hose inner passage 344, which conducts it at outlet/inlet 318 and chamber section 326, keeping that chamber section fully compensated as it increases in volume because of the rightward movement of piston 320. Any compensating fluid needed from reservoir chamber 394 is provided through port 392 and valve chamber 378. As with the other valve mechanisms, should the pressure in the valve chamber become less than the pressure in the reservoir chamber, the higher pressure will act on the valve body and force it away from its valve seat to open the compensation port to the valve chamber and permit fluid to be supplied from the reservoir chamber for compensation.

This arrangement provides an effectively closed pressure system in a push-pull or master-slave actuator/servomotor hydraulic circuit. It is useful in many areas where a Bowden cable is difficult to install, because it can be routed around tight places without binding. It is less subject to corrosion than Bowden cables. It is self-compensating and self-deaerating. It is only necessary for bleeding or air removal via the valves to the reservoir chamber that the reservoir and valve assembly be located at the high point in the hydraulic system. It may be near either actuator/servomotor unit, or at some distance from either of them. This provides great design latitude when the mechanism is to be used in a truck, truck-trailer combination or passenger car. It is understood that actuator/servomotor 300 may be a brake or clutch master cylinder, and actuator/servomotor 300' may be a brake wheel cylinder or a clutch actuator, by way of example.

FIG. 9 shows a system similar to that of FIG. 8 specifically adapted to a vehicle parking brake system so that the hydraulic cable takes the place of the Bowden type cable in common use. Similar elements are assigned similar reference numerals in the 400 series rather than in the 300 series of FIG. 8. The servomotor/actuator 400' is operatively connected by its push rod 414' to the vehicle parking brake (not shown) so that it applies the parking brake in one direction of movement and releases the parking brake in the other direction of movement. It is functionally the same as servomotor/actuator 300', but is simplified by the use of parallel hose conduits 436' and 438' instead of concentrically disposed conduits.

The actuator/servomotor mechanism which is controlled by the vehicle operator to apply and release the parking brake may be of the same construction as the servomotor/actuator 400', but is here illustrated as being separated into separate apply and release actuators 400 and 401. These are simple hydraulic cylinders with a piston reciprocally movable in each cylinder, the pressure chambers of the cylinders being connected to the reservoir and valve assembly 450. The push rod 414 is a common push rod connected to both pistons (not shown), and it in turn is illustrated as being schematically connected to a parking brake apply handle or pedal 498. If it is an apply handle, it is usually pulled rightwardly to apply the parking brake. If it is an apply pedal, it is usually moved leftwardly as seen in the drawing. These directions of apply movement are conventional and are based on the ability of a vehicle operator to apply appropriate actuating force to the handle or pedal. The handle or pedal 498 is understood to have appropriate ratchet or similar mechanism by which the linkage actuated by it may be latched in the parking brake apply position and may be released when desired. Further description will be on the premise that element 498 is a handle to be pulled rightwardly by the vehicle operator to apply the parking brake.

Actuator 400 is connected by hose 436 to one inlet/outlet of assembly 450 comparable to the inlet/outlet 370 of assembly 350 in FIG. 8. Actuator 401 is connected by hose 438 to the other inlet/outlet of assembly 450 comparable to the inlet/outlet 372 of assembly 350 in FIG. 8. Assembly 450 may be constructed similar to assembly 350, but its passages comparable to passages 366 and 368 of assembly 350 are parallel passages and not concentrically arranged passages. The valve chambers and valve mechanisms in assembly 450 may still be axially spaced apart much as they are in assembly 350. Also, because the two fluid circuits are kept separate except for the reservoir chamber, it may be desirable to have separate reservoir chambers for each circuit. To this end the reservoir housing portion 462 may be internally divided to provide two chambers. Such arrangements are well known in the master cylinder reservoir art. The hoses 436' and 438' are respectively connected to the outlets/inlets of assembly 450 which are functionally comparable to the outlets/inlets 374 and 376 of assembly 350. As noted above, these outlets/inlets will be parallel and not concentrically disposed since the passages within the main body portion 460 comparable to passages 366 and 368 are parallel rather than concentrically disposed. The same is true of the inlets/outlets at the opposite ends of these passages.

When the vehicle operator pulls on handle 498 to apply the parking brake, push rod 414 is moved rightwardly, causing the piston in actuator 400 to pressurize fluid in hose 436 and transfer fluid through one of the valve chambers in housing main body section 460, moving the valve mechanism therein and closing the associated compensation port. The fluid at this time has both flow and pressure values, and is conducted through hose 436' to chamber 426', moving piston 420 and piston rod 414' rightwardly and applying the parking brake. At the same time that this occurs, fluid is displaced from chamber 424' and passes through hose 438' into the other valve chamber in housing main body section 460, causing the valve mechanism in that other valve chamber to open the compensation port associated with it. Fluid from that valve chamber, and the reservoir chamber if needed, passes through hose 438 into the other actuator 401, the pressure chamber in that actuator being increased in volume by the movement of push rod 414 and the piston in that actuator.

The parking brake handle 498 and its associated latching mechanism latches the handle, and therefore the linkage controlled by it (including push rod 414), in the parking brake applied position. The parking brake apply pressure is maintained in actuator chamber 426' and the valve in the valve chamber associated with hose 436' remains closed because of the pressure differential acting across the valve member effective area exposed on one side to the relatively high apply pressure and on the other side to the substantially atmospheric pressure of the fluid in the reservoir.

When the parking brake handle 498 is released, it is moved leftwardly as seen in FIG. 9, and the system functions in the reverse manner comparable to the release function of the system of FIG. 8. The open compensation port is closed and the closed compensation port is opened by the fluidic valves in their respective valve chambers, pressure is released in chamber 426' and applied in chamber 424', moving the push rod 414' leftwardly and releasing the parking brake.

I claim:
1. A fluid flow sensitive valve assembly comprising:
   a housing having a valve mechanism received in a valve chamber formed in said housing, said valve chamber having a cylindrical side wall and axially spaced end walls and first and second ports respectively opening through said end walls and a third port opening through a valve seat formed in said cylindrical side wall at a point axially intermediate said end walls;
   said valve mechanism including a valve member located partially within said valve seat and movable relative thereto into seated and unseated positions to respectively close and open said third port;
   a valve member positioning device pivotally mounted on said valve member and movable with said valve member as said valve member moves between its seated and unseated positions relative to said valve seat;
   said valve member and said valve member positioning device having valve mechanism position location points thereon engagable with said valve chamber side wall and one of said valve chamber end walls for locating said valve mechanism in said valve chamber so that said valve member is unseated from said valve seat when there is no fluid flow through said valve chamber and also when there is fluid flow from said second port to said first port through said valve chamber, and said valve member is seated on said valve seat to close said valve seat and said third port when there is fluid flow from said first port to said second port through said valve chamber;
   and fluid flow-impinging surfaces on said valve mechanism acting when fluid flow impinges thereon from said first port to said second port to move said valve mechanism from the valve member unseated position to the valve member seated position relative to said valve seat and acting when fluid flow impinges thereon as fluid flows toward said first port in said valve chamber from at least one of said second and third ports to move said valve mechanism from the valve member seated position to the valve member unseated position relative to said valve seat.

2. The valve assembly of claim 1 in which said valve member positioning device has one end initially engaging said valve chamber cylindrical side wall as said valve mechanism is moved from the unseated valve member position toward the seated valve member position to establish a pivot point about which said valve member is then moved into its seated position with said valve seat, said pivot point also having said valve mechanism pivotally moved thereabout to unseat said valve member from said valve seat with said positioning device one end continuing to engage said valve chamber cylindrical side wall so long as there is fluid flow from said second port into said valve chamber.

3. The valve mechanism of claim 2 in which said positioning device has one fluid flow-impingable surface acted on by fluid flow from said first port into said valve chamber to initiate movement of said valve mechanism toward valve member seating on said valve seat, such valve mechanism movement causing said positioning device one end to move into engagement with said valve chamber cylindrical side wall, the fluid flow from said first port into said valve chamber then continuing to act on said one fluid flow-impingable surface to cause pivotal movement of said valve mechanism about said positioning device one end to seat said valve member on said valve seat and close said third port.

4. The valve mechanism of claim 3 in which said positioning device has a second fluid flow-impingable surface which when acted on by fluid flow from said second port into said valve chamber initiates pivotal movement of said valve mechanism about said positioning device one end to unseat said valve member from said valve seat.

5. The valve mechanism of claim 4 in which said positioning device has a third fluid flow-impingable surface which is also, acted on by fluid flow from said second port into said valve chamber to hold said positioning device one end into continued pivot point contact with said valve chamber cylindrical side wall and prevent closing of said valve seat by said valve member so long as there is fluid flow from said second port into said valve chamber.

6. A fluid flow sensitive valve mechanism positioned in a valve chamber between first and second inlet-outlet ports opening into said valve chamber, said valve mechanism having a valve member controlling the opening and closing of a third inlet-outlet port opening into said valve chamber by being moved from a third port-opened position to a third port-closed position in response to the flow of fluid into the valve chamber from said first port which impinges on first surface means of said valve mechanism and being moved from the third port-closed position to the third port-opened position in response to the flow of fluid into the valve chamber toward said first port which impinges on second surface means of said valve mechanism, said valve mechanism further having valve mechanism positioning means engagable with at least one wall of said valve chamber while fluid flow is passing through said valve chamber to position said valve member relative to said third port and to pos-tion said first and second surface means of said valve mechanism for fluid flow impingement thereon.

7. The valve mechanism of claim 6 in which said positioning means is in engagement with a side wall of said valve chamber adjacent said third inlet-outlet port while the flow of fluid is impinging on said second surface means of said valve mechanism and preventing the closing of said third inlet-outlet port by said valve member while there is any fluid flow in said valve chamber toward said first inlet/outlet port.

8. The valve mechanism of claim 6 in which said first and second surface means are each at least in part on said positioning means.

9. The valve mechanism of claim 8 in which said first and second surface means are each also in part on said valve member.

10. The valve mechanism of claim 8 in which said positioning means is pivotally mounted on said valve member and is capable of transmitting forces to said valve member moving said valve member in response to fluid flow impingement forces on said first and second surface means of said positioning means.

11. A fluid flow sensitive valve assembly oomprising:

a housing having a valve chamber formed therein and first and second and third inlet-outlet ports communicating with said chamber, said first and second ports being generally axially aligned and at opposite ends of said chamber, said third port having a valve seat at said chamber, said chamber having a circular cross-section and an axially extending side wall surface through which said third port opens, said chamber also having end walls through which said first and second ports open, one of said end walls having an annular conically beveled surface portion formed about said first port;

a movable valve mechanism in said valve chamber, said valve mechanism having a valve member and a positive positioning device, said valve member comprising a valve body engagable with said valve seat in opening and closing relation and a guide pin on said valve body extending through said valve seat and into said third port, a longitudinally extending valve member planar section having said valve body extending from one side thereof adjacent one planar section end and a pair of legs extending from the other side thereof adjacent the other planar section end, a first opening formed through said planar section between said legs and extending through a part of said valve body and defining with said valve body a valve body wall, and a second opening formed through said planar section and extending transversely of said planar section between said valve body and said one planar section end;

said valve mechanism positive positioning device comprising a sheet member which is generally L-shaped in cross section, said device having a first section and a second section connected with said first section by a first transverse bend;

said device further having a pivot line formed by said first transverse bend and a stop surface formed by another transverse bend in said first section, said another bend being axially spaced from said first bend, said first section being a first fluid flow impingement section and having an upper side and a lower side and of a lateral width less than the lateral width of said first and second openings, said upper side and said lower side being respectively angularly disposed relative to said first and third ports, said second section being a second fluid flow impingement section and having a convex side and a concave side with said convex side facing away from said first section and toward said third port, said second section being of greater width than said second opening and defining shoulders at said first transverse bend which are lateral extensions of said pivot line, said second section having an outer end;

said device first section extending first through said second opening so that said shoulders of said second section rest on said planar section on either side of said second opening and then extending under said valve body and through said first opening so that said stop line is engagable with said valve body wall and said device first section is pivotally movable about said first pivot line;

whereby fluid flowing into said chamber from said first port impinges on said device first section lower side, engaging said device first section stop line with said valve body wall, said fluid also impinging on the side of said valve member planar section opposite said valve body, the impingements of said fluid flow acting on said valve mechanism to move said valve body into engagement with said valve seat and close said third port, said second impingement section outer end engaging said chamber wall, the fluid flowing from said first port flowing out through said second port; and fluid flowing into said chamber from said second port impinges on said device second impingement section tending to hold said second impingement section outer end into engagement with said chamber wall and flows around and under said second impingement section and impinges on said first impingement section upper side, causing said positioning device to pivot at said pivot line on said valve member and then cause said valve member and said positioning device to be moved pivotally about said second impingement section outer end to move said valve body away from said valve seat and allow fluid in said valve chamber to flow back to said reservoir through said third port; said valve mechanism moving upon cessation of fluid flow in said valve chamber returning to its rest position with said leg ends engaging said conically beveled surface of said chamber one end wall and said planar section corners engaging said chamber side wall and supporting said valve mechanism with said valve body open relative to said valve seat.

12. In a master cylinder assembly having a fluid pressurization chamber, said fluid pressurization chamber having a cylindrical side wall and end walls with at least one end wall being axially movable relative to said cylindrical side wall when the master cylinder assembly is actuated and released, a housing having port means continuously communicating with said pressurization chamber and adapted to be connected to a fluid circuit to be pressurized upon actuation of said master cylinder assembly and to be unpressurized upon release of said master cylinder assembly, said port means having a compensation valve chamber formed in said housing defined by a cylindrical side wall and axially opposite end walls, one of said end walls having a conically beveled annular surface through which one port of said port means opens into said valve chamber, a fluid reservoir containing a fluid supply for said master cylinder and the fluid circuit, and a port providing fluid communication between said reservoir and said valve chamber and terminating in said valve chamber with an annular valve seat, the improvement comprising:

flow responsive valve mechanism positioned in said valve chamber in pivotal and slidably movable engagement with said valve chamber cylindrical side wall and comprising a valve member and a valve member positioning device pivotally mounted on said valve member, said valve member having leg means extending toward and engagable with said valve chamber end wall conically beveled annular surface and defining one limit of axial movement of said valve mechanism in said valve chamber, said positioning device having fluid flow-impinging surfaces thereon acted upon by fluid flow through said port means to pivotally and slidably move said valve member to close said valve member against said valve seat when that fluid flow is from said pressurization chamber and to open said valve member from said valve seat when that fluid flow is toward said pressurization chamber, said valve mechanism having a greater specific gravity than the fluid and acting under the influence of gravity to open said valve member relative to said valve seat when there is no fluid flow in said port means and the fluid pressure in said valve chamber is no greater than the fluid pressure in said reservoir.

13. A hydraulic fluid pressure operating system comprising first hydraulic actuator means which serves as a master unit, second hydraulic actuator means which serves as a slave unit, first and second fluid conduit means connecting said first and said second hydraulic actuator means for fluid flow and pressure connection therebetween, and a reservoir and reservoir compensation port control assembly for controlling fluid flow in said first and second conduit means, said reservoir and reservoir compensation port control assembly having a first fluidic valve assembly in said first fluid conduit means and a second fluidic valve assembly in said second fluid conduit means, each of said fluidic valve assemblies including a fluid flow sensitive valve mechanism as defined by claim 6 with said first fluid conduit means being connected to said first and second ports of said first fluidic valve assembly and said second fluid conduit means being connected to said first and second ports of said second fluidic valve assembly, said third ports of said fluidic valve assemblies being connected to fluid reservoir chamber means in said reservoir and reservoir compensation port control assembly.

14. The hydraulic fluid pressure operating system of claim 13 in which said first hydraulic actuator means is a brake master cylinder and said second hydraulic actuator means is a brake wheel cylinder.

15. The hydraulic fluid pressure operating system of claim 13 in which said first hydraulic actuator means is controlled by a vehicle operator-operated parking brake actuating and release mechanism and said second hydraulic actuator means is a vehicle parking brake actuator.

16. The hydraulic fluid pressure operating system of claim 13 in which said first hydraulic actuator means is the input means for a hydraulic substitute for a push-pull cable, and the hydraulic fluid in said system is means for transmitting force between said first hydraulic actuator means and said second hydraulic actuator means and a hydraulic substitute for a push-pull cable, said second hydraulic actuator means being the output means for the hydraulic substitute for a push-pull cable.

17. The hydraulic fluid pressure operating system of claim 13 in which said reservoir and reservoir compensation port control assembly is located at the high point of said first and second fluid conduit means.

* * * * *